United States Patent
de Cremoux (10) Patent No.: US 9,793,798 B1
(45) Date of Patent: Oct. 17, 2017

(54) COMPENSATION OF ERRORS IN CURRENT LIMITERS

(71) Applicant: Dialog Semiconductor (UK) Limited, London (GB)

(72) Inventor: Guillaume de Cremoux, Edinburgh (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/130,428

(22) Filed: Apr. 15, 2016

(51) Int. Cl.
*H02M 3/156* (2006.01)
*H02M 3/157* (2006.01)
*H02M 1/00* (2006.01)

(52) U.S. Cl.
CPC .... *H02M 3/157* (2013.01); *H02M 2001/0025* (2013.01)

(58) Field of Classification Search
CPC . H02M 2001/0009; H02M 2001/0025; H02M 3/156
USPC ................. 323/222, 282, 283, 284
See application file for complete search history.

(56) References Cited

U.S. PATENT DOCUMENTS

| | | | | |
|---|---|---|---|---|
| 7,791,326 B2* | 9/2010 | Dahlman | ........... | H05B 33/0818 315/224 |
| 2007/0108951 A1* | 5/2007 | Coleman | ............... | H02M 3/156 323/282 |
| 2007/0210766 A1* | 9/2007 | Borowy | .................. | H02M 1/32 323/222 |
| 2013/0294118 A1* | 11/2013 | So | ..................... | H02M 3/33507 363/21.16 |
| 2016/0285366 A1* | 9/2016 | Lee | .................... | H05B 33/0815 |

* cited by examiner

*Primary Examiner* — Jeffrey Sterrett
(74) *Attorney, Agent, or Firm* — Saile Ackerman LLC; Stephen B. Ackerman (57) ABSTRACT

The present disclosure applies to peak current limitation and also to ensuring that a minimum current condition is not exceeded, that is, that the current through a component remains at or above a desired minimum level. A current limitation circuit compensates for time-induced errors by sampling and holding a current or voltage value at the time when a power switch changes state, deriving a rate of change of the electrical parameter and extrapolating the value over time. The extrapolated value is used for subsequent post-processing such as duty cycle modification of a switching mode DC-DC converter.

21 Claims, 7 Drawing Sheets

COMPENSATION OF ERRORS IN CURRENT LIMITERS

TECHNICAL FIELD

The present disclosure relates to compensation of errors, in particular to time-induced errors, in circuits used to limit current through or delivered to components of electronic circuits.

BACKGROUND

Current limiters are needed in a variety of scenarios, for ensuring that current flowing through a component does not exceed a boundary condition such as a peak current or a minimum current. One example application is to limit the current flowing through an energy storage element in a switched mode power supply (SMPS) or other circuit that applies a varying current to a circuit component.

Limitation of current involves detecting the current through or at a component and then modifying the configuration or operation of a circuit to decouple the component from the source that is supplying the current. However, there is a time delay between detecting that a given current threshold has been met or exceeded, and then decoupling the component from the current source. This delay arises from factors including the time taken for the detection circuitry and switching circuitry to operate. in cases where the component is an inductor, delays can also arise due to limitations which are placed on how rapidly the voltage bias can be modified across the inductor.

These delays result in an excessive build-up of current in the component and therefore can result in various undesired effects, such as errors in the operation of or causing damage to the circuit of which it forms a part. For example, the current overshoot in an inductor of a SMPS circuit can result in exceeding the saturation current of this inductor.

SUMMARY

According to a first aspect of the disclosure there is provided a method of measuring a current through a circuit component which is coupled between an input supply and an output node, and whereby a power switch is provided which selectively couples the component with the input and/or the output; the method comprising: extracting an electrical parameter associated with the component at a time of changing the state of the power switch; storing information about the rate of change of the extracted electrical parameter; extrapolating a measured electrical parameter value based on the stored rate of change information; and determining a boundary current value based on an extrapolated electrical parameter value.

Optionally, the electrical parameter associated with the component is a current through the circuit component.

Optionally, the electrical parameter associated with the component is a voltage at or across the circuit component.

Optionally, extracting an electrical parameter associated with the component at a time of changing the state of the power switch comprises extracting the electrical parameter with a scaled sense device.

Optionally, extracting the electrical parameter with a scaled sense device comprises creating a scaled replica of a current through the component and comparing it with a reference, either as a voltage or a current comparison.

Optionally, extracting the electrical parameter with a scaled sense device comprises comparing a voltage across the power switch that is caused by the current flowing through the component with the voltage across a sense device that is coupled with a reference current source which generates a scaled version of the desired boundary current value.

Optionally, the circuit component is an energy storing element.

Optionally, the energy storing element is an inductor.

Optionally, determining a boundary current value based on an extrapolated electrical parameter value comprises stopping the extrapolation when the inductor voltage polarity changes its sign.

Optionally, the inductor forms part of a switched mode power supply circuit and the power switch is operable to alternate the phases of the switched mode power supply circuit.

Optionally, the boundary current value is a peak current value.

Optionally, the boundary current value is a minimum current value.

According to a second aspect of the disclosure there is provided a DC-DC converter comprising an input supply; an output node; a circuit component coupled between said input supply and output node; a power switch which selectively couples the component with the input and/or the output; and a peak current detector arranged to: extract an electrical parameter associated with the component at a time of changing the state of the power switch; store information about the rate of change of the extracted electrical parameter; extrapolate a measured electrical parameter value based on the stored rate of change information; and determine a boundary current value based on an extrapolated electrical parameter value.

Optionally, the circuit component is an energy storing element.

Optionally, the energy storing element is an inductor.

Optionally, inductor forms part of a switched mode power supply circuit and the power switch is operable to alternate the phases of the switched mode power supply circuit.

Optionally, the boundary current value is a peak current value.

Optionally, the boundary current value is a minimum current value.

According to a third aspect of the disclosure there is provided a current detector circuit comprising: an extraction module arranged to extract an electrical parameter associated with a circuit component; a slope extractor module arranged to store information about the rate of change of the extracted electrical parameter and to extrapolate a measured electrical parameter value based on the stored rate of change information; a converter module arranged to determine a boundary current value based on an extrapolated electrical parameter value.

Optionally, the boundary current value is a peak current value.

Optionally, the boundary current value is a minimum current value.

BRIEF DESCRIPTION OF THE DRAWINGS

The present disclosure will be described below, by way of example only, with reference to the accompanying figures, in which.

DESCRIPTION

The present disclosure applies to peak current limitation and also to ensuring that a minimum current condition is not exceeded, that is, that the current through a component remains at or above a desired minimum level.

One application of the present disclosure is to limit the current flowing through an inductor. Inductors are used in various types of circuits, and to illustrate the disclosure the example of a boost converter will be illustrated. It is to be understood that the disclosure applies to limiting the current through an inductor in other types of SMPS including buck, buck-boost and flyback converters to name some examples, and in general to limiting the current in other types of circuit components.

Figure 1:
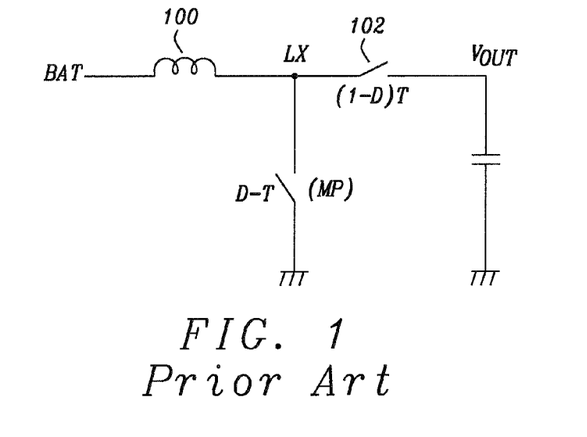
FIG. 1 illustrates a boost converter.

FIG. 1 shows an existing boost converter, in which a power switch MP is cycled on and off to switch the boost converter between two different configurations in order to supply a higher voltage at the converter output (VOUT) as compared with the voltage at its input (BAT), using an inductor 100 as an energy storage element. The level of the boost is defined by a duty cycle D, defining a time during a switching cycle T during which the power switch MP is in an on state. A secondary switch element 102 follows the main power switch MP (being kept in the opposite state to MP), and may be replaced by a diode in alternative implementations.

In the on (closed) state of the power switch MP the energy from the supply charges the inductor and the current in the inductor increases. In the off (open) state of power switch MP the inductor and the supply effectively act as series-coupled power sources and supply power to the load. During this phase, current in the inductor decreases. This kind of operation is in itself well known to the skilled person, so will not be described in more detail herein.

The detection of an inductor boundary (peak or minimum) current can be achieved by indirect or direct measurement methods. In an indirect measurement method, a scaled replica of the inductor current is created and then compared with a reference, either as a voltage or a current comparison, to detect when a peak current has been reached or exceeded. In a direct measurement method, a voltage across the power switch that is caused by the current flowing through the inductor is compared with the voltage across a sense device that is coupled with a reference current source which generates a scaled version of the desired peak current.

Figure 2:
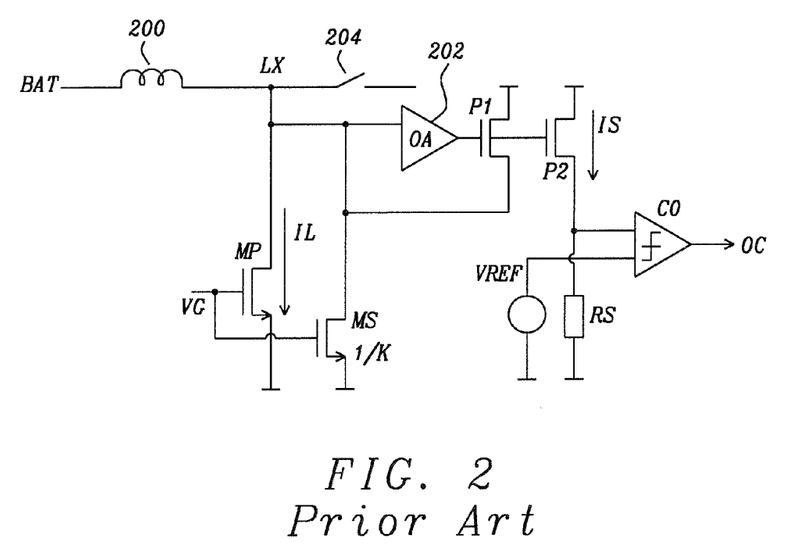
FIG. 2 illustrates a circuit which implements a first (so-called "indirect") method of limiting the peak current in an inductor of a boost converter.
Figure 3:
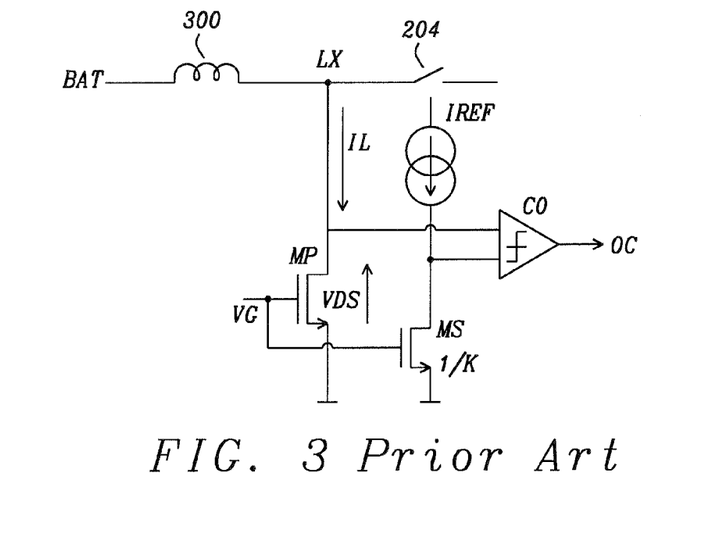
FIG. 3 illustrates a circuit which implements a second (so-called "direct") method of limiting the peak current in an inductor of a boost converter.

The indirect and direct methods are illustrated in FIGS. 2 and 3 for the case of peak current limitation. In each case, an inductor (200, 300) is coupled between a supply (represented here as a battery, with voltage V(BAT)) and a load. A power switch MP is selectively operated to switch the boost circuit between a first phase where the current in the inductor 200, 300 increases, and a second phase where the current in the inductor 200, 300 decreases. Secondary switch 204 is a complementary switch of the power switch MP (so, it is always in the opposite state to the power switch), or it may in alternative arrangements be replaced by a diode that allows current flow from the supply to the output. The power switch MP is designed to switch from the first phase to the second phase once a peak current has been reached. Other types of switched mode power supplies also operate in a similar principle, namely, switching between different phases where an energy storage element is charged and discharged respectively. It will be appreciated that the principles of this disclosure are not limited to boost converters but can be applied to other types of SMPS and indeed generally to any component which is subject to a varying current where it is desired to limit the current.

FIG. 2 illustrates an example of an indirect method of limiting the current in an inductor 200 of a boost converter. The inductor current IL flows through a power switch MP which in this example is a large NMOS switch, and an amplifier 202 (OA) regulates a state when the drain of the switch MP matches the drain of a sense device MS which has its gate coupled with the gate of the switch MP.

The sense device MS may also be an NMOS transistor, and will be smaller than the switch MP by a factor of k, so will be k times more resistive. Once the drains of MP and MS are matched, then the current IL/k flows through the sense device MS, driven through P1, and is copied using P2 into IS, then converted to a voltage using RS and compared to a reference VREF to generate the net overcurrent, oc. The overcurrent signal oc is used to turn off MP in case an overcurrent is asserted by the comparator C0. The comparator C0 may be referred to as an overcurrent comparator, meaning it asserts an overcurrent signal at its output if its inputs are indicative of a peak circuit component current being matched or exceeded.

FIG. 3 illustrates an example of a direct method of limiting the current in an inductor 300 of a boost converter. The inductor current IL flows through a power switch MP which in this example is a large NMOS switch, and cause a voltage drop VDS across the drain and source of the power switch MP. A sense device MS is provided, which may also be an NMOS transistor and will be smaller than the power switch MP by a factor of k, so will be k times more resistive. The sense device MS has its gate coupled with the gate of the switch MP.

VDS is compared to the voltage drop across the sense device MS, where a current source injects a reference current IREF. So by sizing IREF to the target peak current IPEAK/k, the comparator C0 generates an overcurrent signal (the comparator fires to change logic state of the oc output) at the moment IPEAK is reached by IL(t) in the power switch MP.

Figure 4:
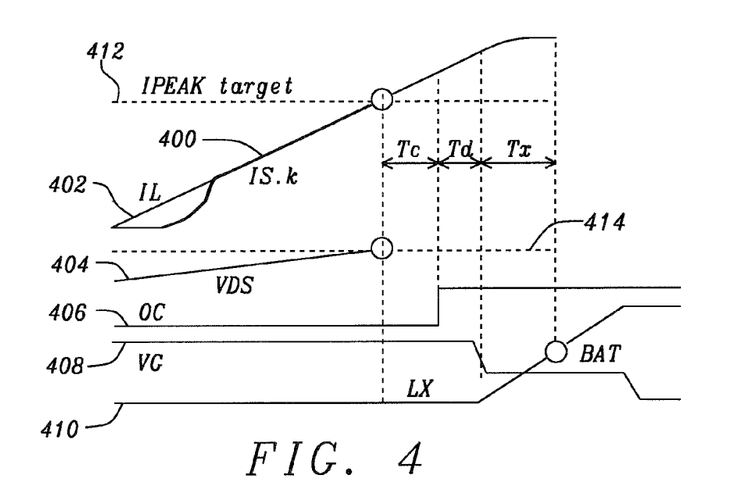
FIG. 4 illustrates aspects of the operation of the circuits of FIGS. 2 and 3.

Both of the indirect and direct methods of current peak detection are sensitive to delays. This is illustrated in FIG. 4, which shows the measured scaled inductor current 400 (IS.k) of the indirect method and the actual inductor current 402 (IL), together with the measured voltage 404 (VDS) of the direct method, the overcurrent signal 406 (oc), power switch gate voltage 408 (VG) and inductor switching node voltage 410 (LX). It is noted that in the indirect method, the measured current IS.k takes a little time to match the inductor current IL as the drains of the sense device MS and power transistor MP are not initially matched at the start of a measurement cycle. Once the drains are matched, the measured current IS.k matches the actual inductor current IL.

It is desired to limit the inductor current to a maximum value 412 (IPEAK target), which corresponds to a maximum VDS voltage 404 in the direct method. However, once the maximum value has been detected there are several delays before the current source is decoupled from the inductor. As a result of these delays Tc, Td, Tx, the inductor current IL continues to rise for a period of time and goes beyond the desired maximum threshold.

A first source of a time delay is a comparator delay time, Tc. As can be seen from FIG. 4, after the peak current value has been reached, there is a delay Tc before the overcurrent signal oc is asserted. It is necessary to build an overdrive at the overcurrent comparator (C0 shown in FIGS. 2 and 3) in order to make it change state, and so a delay time Tc is required for the comparator to set the overcurrent signal. A typical value of the delay time may be 5 ns.

A second source of a time delay is a driver delay time, Td. As can be seen from FIG. 4, after the overcurrent signal oc is asserted, there is a delay Td before the power switch is driven off and its gate voltage VG decays. After the overcurrent comparator flags an overcurrent state (setting oc=1), the switching off of the power switch (MP in FIGS. 2 and 3) takes some time. A typical value of this driver delay Td may be 5 ns.

A third source or a time delay is a ramp up time, Tx. As can be seen from FIG. 4, the inductor switching node voltage LX only starts to increase after the power switch's gate voltage VG decays, and there is a delay Tx before the inductor switching node voltage LX crosses V(BAT) so that no more current is built in the inductor and the peak is reached. This delay Tx occurs because the rate at which the inductor switching node LX is intentionally limited for safety reasons and to reduce electromagnetic interference created by excessive rate of change of the LX voltage. A typical value for the ramp up time may be 5 ns.

These time delays can result in significant errors. To give an example, a system might have an inductor value of 0.47 uH (which can be de-rated to 0.35 uH) and V(BAT) can reach 5V. In that case, the total 15 ns delay results in an extra charge 15 ns*V(BAT)/L of ~150 mA. This implies that if the desired target peak current is 1 A, then the delays result in an error of 15%.

Figure 5:
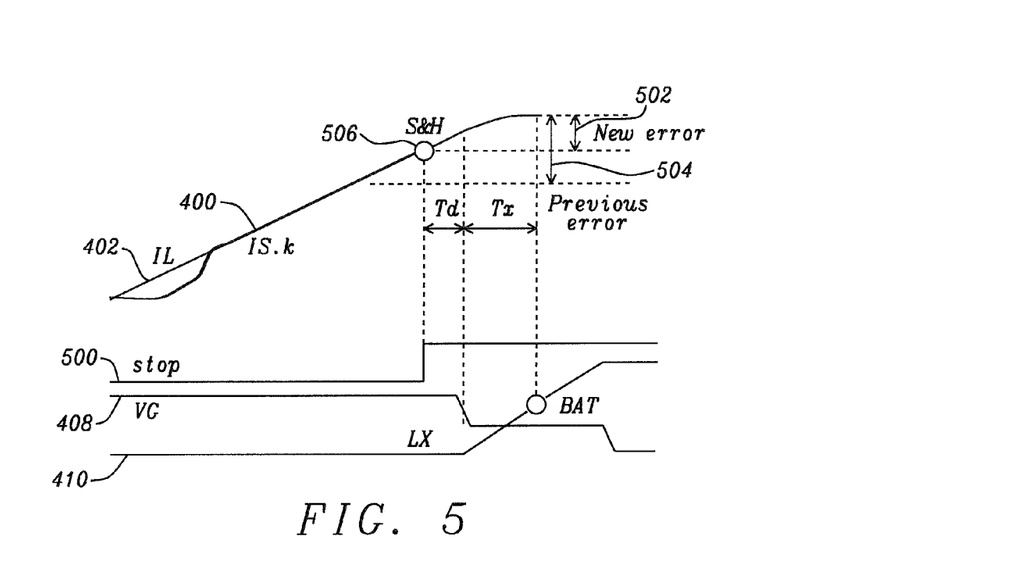
FIG. 5 illustrates aspects of the operation of a circuit that limits the peak current in an inductor of a boost converter, in which a measure of the inductor current is sampled and held.

A solution to errors caused by the comparator delay Tc can be to sample and hold the inductor current just before switching off the power switch MP, instead of relying on the use of an overcurrent comparator C0. This may be done using the resulting voltage drop of the inductor current. As shown in FIG. 5, the Tc comparator delay time no longer makes a contribution to an error between the tracked value IS.k and the actual inductor value IL. Note that the delay from the operational amplifier OA 202 is made negligible by design FIG. 5 shows similar measurements of the scaled inductor current 400 (IS.k), actual inductor current 402 (IL), power switch gate voltage 408 (VG) and inductor switching node voltage 410 (LX) as shown in FIG. 4. However, instead of an overcurrent signal oc being asserted by an overcurrent comparator, a stop signal 500 is asserted, switching off the power switch MP, and samples the current value IS.k, see sample and hold "S&H" 506. A post-processing loop can assert whether the maximum IPEAK target has been exceeded or not, and regulate the duty-cycle of the boost to keep the sampled current equal or lower than the target. When the regulation has settled, this duty-cycle is reflected as a trigger signal 500 ("stop") that is used to change the state of the power switch, and changes coincidentally state when the peak current limitation is reached. As can be seen in FIG. 5, the use of a sample and hold technique in place of an overcurrent comparator results in a smaller error 502 as compared with the previous error 504 that would be present in the technique shown in FIG. 4.

The errors due to the delays Td and Tx still remain. One possible way to deal with these errors would be to trigger the sample and hold (that is, switch off the track and hold switches T&H) at the moment the power switch MP is actually turned off, thus bypassing Td and using the VG voltage shown in the FIGS. 2, 3 and 9.

However, this creates some issues. First of all, this creates concurrent processes without any safety margin. For some corners, and particularly due to the same power switch MP (or VG) deactivation signal having to cross a level-shifter to reach the T&H switches, MP may be turned off before the S&H switches are turned off, thus triggering errors for the T&H inductor value.

Also, using VG means the power driver already has switching activity, which already makes the power ground bounce, as the same time the T&H is toggling. Very large errors can result, because power drivers often inject spikes of current to ground. This can for example be currents of around 0.5 A during a few ns.

An alternative approach according to this disclosure is to track the inductor current value further (during the times Td and Tx) once the sample and hold operation has been done until the boundary condition is actually reached, and even if the power switch MP is turned off.

According to this technique, from the moment the inductor current is sampled and held by the T&H operation, the inductor current is extrapolated, even if it is not sensed by direct or indirect methods, and even if the power switch MP is turned off.

This extrapolation can continue until the inductor switching node voltage LX reaches the voltage value of the load (VBAT). This can be detected with any suitable means, such as a 1-bit A-D converter like a Schmitt trigger. Then the final value of the inductor current can be used for post-processing.

As well as extrapolating current, the present disclosure may also extrapolate other electrical parameters associated with an inductor, energy storage element, or other circuit component, such as voltage.

Figure 6:
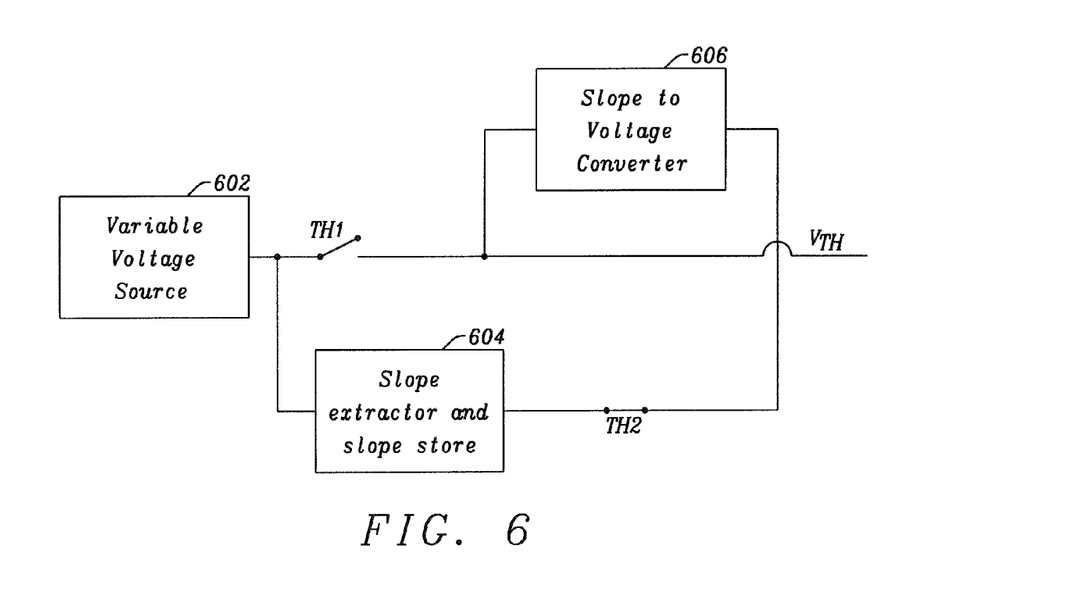
FIG. 6 illustrates a peak current detector according to an embodiment of the disclosure.

FIG. 6 illustrates part of a peak current limiting circuit according to the disclosure, in which the slope of the inductor current is extrapolated, with the extrapolated value being used to calculate the peak current value. For illustration, various modules are shown which represent different functional elements of a system according to the disclosure. However, it is to be appreciated that this modular representation does not necessarily mean that each module is a separate independent circuit or that the physical layout of the modules is as shown. It will be appreciated that one or more circuits may be provided which combine one or more of the shown modules, and that the overall system of FIG. 6 may itself be a component part of a larger system, forming either an independent or an integrated element thereof.

As shown in FIG. 6, operation of a track and hold procedure is governed by track and hold switches TH1 and TH2. In a first configuration TH1 is closed and TH2 is open, and in a second configuration (as illustrated) TH1 is open and TH2 is closed.

A first module 602 provides a variable voltage source. A second module 604 receives the varying voltage and stores a representation of the rate of variation of the voltage, the slope. This may be done by converting the varying voltage (dV/dt) to a voltage that tracks with the voltage from the variable voltage source 602.

In the first configuration, the output voltage VTH is derived directly from the variable voltage source 602. Meanwhile, the module 604 derives the slope from the variable voltage source.

Then, once the track and hold phase is ended (at time S&H), the switches TH1 and TH2 change state to the second configuration as illustrated in the figure. The module 604 stores the latest value of the slope, and this is converted back into a voltage by a slope to voltage converter module 606, which provides the output voltage VTH, which varies at the same rate as the rate of change of the variable voltage source before the end of the track and hold phase. The phase where the output voltage VTH is supplied by the extrapolated slope via modules 604 and 606 may be referred to as an "extrapolate and hold" (E&H) phase. Once the inductor value reaches its threshold value, the extrapolation can be stopped and the final result is the measured peak current value for regulation of the duty cycle.

Figure 7:
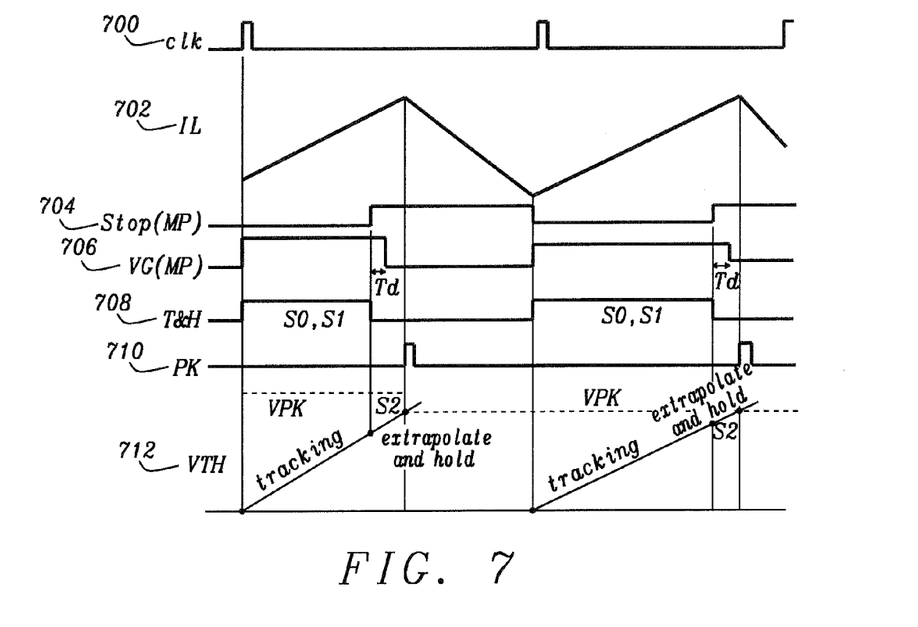
FIG. 7 illustrates the timing of various signals showing the operation of the peak current detector of FIG. 11.
Figure 11:
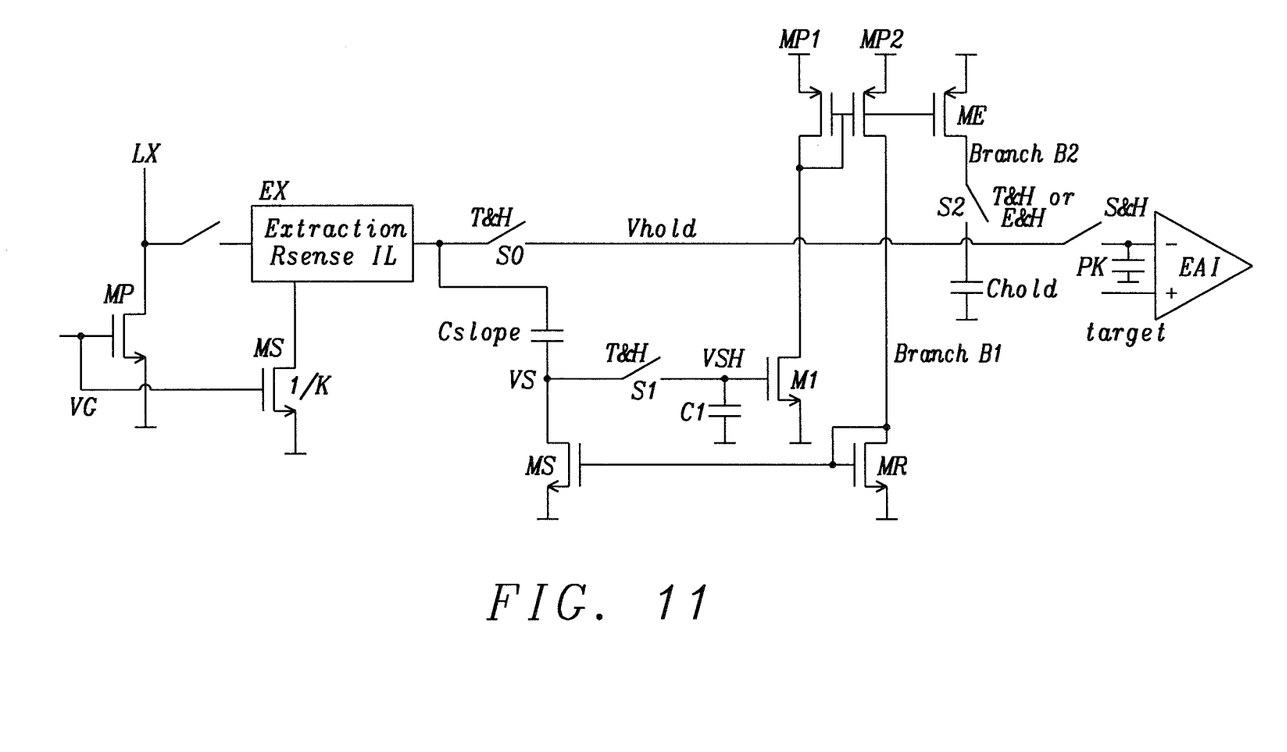
FIG. 11 illustrates one example of a circuit which is suitable for detecting a peak current according to an embodiment of the disclosure and consistent with the operation shown in FIG. 8.

FIG. 7 illustrates the operation of this method, for the example of the specific embodiment of FIG. 11, with the traces representing the system clock 700, inductor current 702, stop signal (MP) 704, gate voltage VG(MP) 706, track and hold operations (T&H) 708, peak detection signal (PK) 710 and output voltage (VTH) 712. Once the stop signal 704 is asserted, the track and hold phase 708 ends, and the output voltage VTH is extrapolated using the stored slope as described above.

Figure 8:
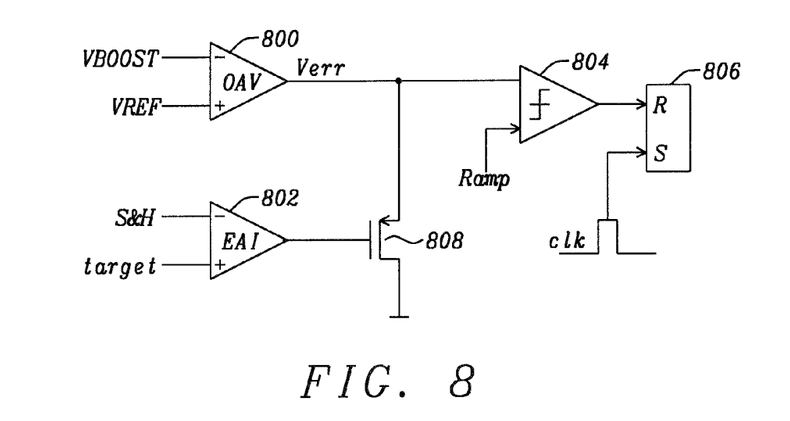
FIG. 8 illustrates a post-processing loop which provides an output for regulating the duty cycle of a boost converter.
Figure 9:
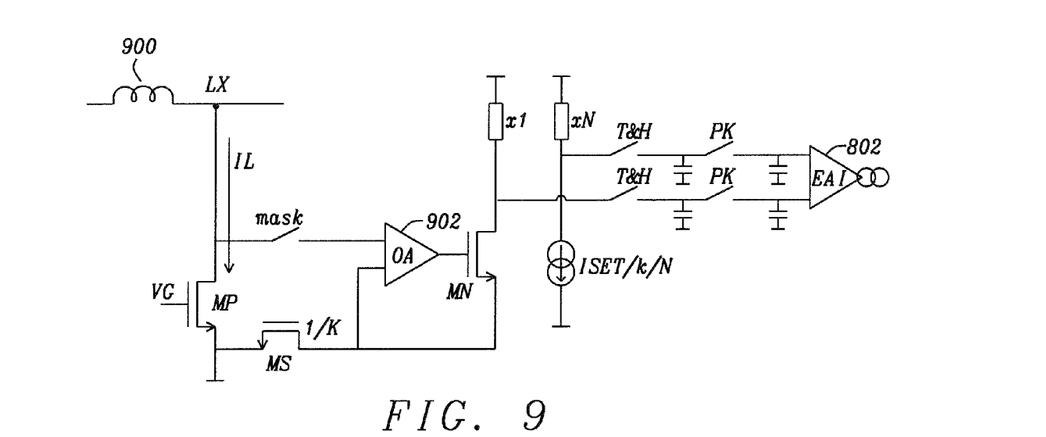
FIG. 9 illustrates a peak current detection circuit which samples and holds a parameter representative of an inductor current (and compares it to an ISET reference)

FIG. 8 shows an example of a post-processing loop that can be used to regulate the duty cycle of a boost (or of a different type of DC-DC convertor or other circuit), and FIG. 9 shows an example of a peak current detection circuit with a sample and hold implementation and using the indirect method.

The circuit of FIG. 8 comprises a voltage operational amplifier 800 (OAV) that compares the boost converter's output voltage VBOOST with a reference voltage VREF and a current error amplifier 802 (EAI) that compares the held current value (S&H) with a target current value (target), and a comparator 804 that compares the error signal Verr output by the voltage operational amplifier 800 with a ramp signal (Ramp) to store a value in a storage element 806, which in this embodiment is a gated SR latch. The value stored in the storage element 806 provides a drive signal for the power switch MP.

If the held (S&H) inductor peak current value exceeds the target, the current error amplifier 802 (EAI) pulls down its output via transistor 808 which pulls down Verr and lowers the main duty-cycle until the balance is reached.

The peak detection circuit of FIG. 9 shares some common components with the circuit shown in FIG. 2. The inductor 900 current IL flows through a power switch MP and an operational pre-amplifier 902 matches the drains of the power switch MP and a sense device MS, as controlled by a mask switch. The mask switch is switched on only while the power switch MP is asserted ON. When the power switch MP is OFF, the mask switch is opened in order to protect the operational pre-amplifier 902 from excessive voltage that may be present at LX. To achieve the matching, the pre-amplifier 902 regulates the inductor current as scaled by the sense device (IL/k) through a transistor MN. This current IL/k is translated into a voltage drop across a resistor x1. Further, a reference current (ISET/k)/N is created across the resistor xN.

Both resistor voltage drops are tracked, then held (switches T&H, where T&H stands for "track and hold") at the moment MP will be turned off. The peak detection switches PK later transmit these held values (reference and peak currents) to the post-processing loop (EAI amplifier 802).

Figure 10:
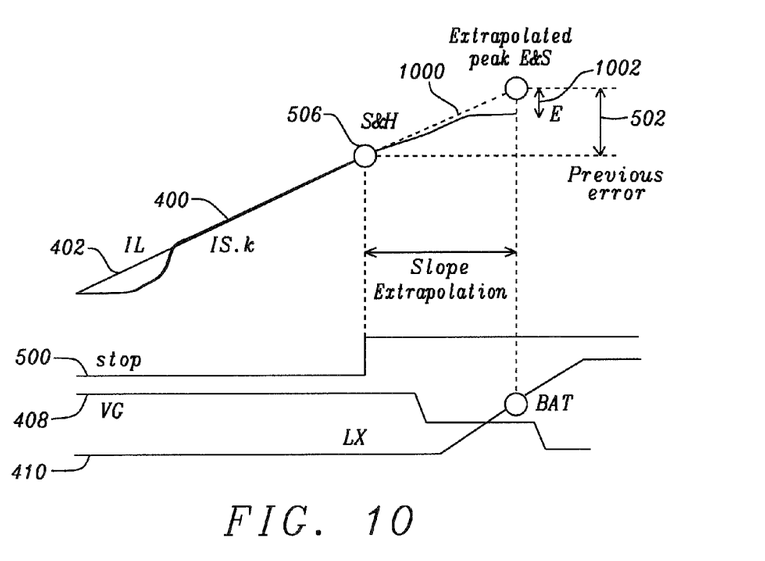
FIG. 10 illustrates the operation of a peak current detection method according to an embodiment of the disclosure.

An advantage provided by this method is illustrated in FIG. 10. This shows the application for the indirect method, but the technique is equally applicable to the direct method. As in the preceding figures, the inductor current 400 (IL) is matched by a scaled measurement 402 (IS.k). A stop signal 500 is triggered by the duty-cycle control and a sample and hold operation 506 is carried out. After that point, the predicted change of inductor current is extrapolated. This is represented by dotted portion 1000 of the plot 402—the portion "E&S" standing for an "extrapolate and sample" phase.

For a linear extrapolation, there will still be a small error 1002 ($\epsilon$) because the rate of change of inductor current, dI/dt, will actually follow a parabolic slope rather than a linear one once the voltage at the inductor switching node LX starts to rise. However, this error 1002 ($\epsilon$) is smaller than the previous error 502 which suffers from both Td and Tx delays in a sample and hold technique, and much less than the original error 504 (illustrated in FIG. 5) which suffers from the Tc delay in addition to the Td and Tx delays.

FIG. 11 shows an example embodiment of a circuit for peak detection which uses the peak extrapolation technique. The components of the circuit include:

Cslope: current generation element
Chold: track & hold storage element
C1: slope storage element
MP1: PMOS mirror driving element
MP2: PMOS mirror copy for extrapolation loop.
ME: Mirror copy for extrapolation
MR: NMOS Mirror driving element
MS: Mirror for the extrapolation loop
VS: Virtual ground: point of comparison of the extrapolation loop.

The extraction block EX (an embodiment of block 602 in FIG. 6) extracts the inductor current flowing through MP by using the sensor MS. One example of a circuit which acts as an extraction block EX is shown in FIG. 9. The output of EX can be considered as a voltage source that varies with the time because the inductor current linearly varies with time (dI/dt=VBAT/L).

Throughout the course of a sample and hold operation, the switches S0, S1 and S2 are ON (closed). S0 is the lower of the track and hold switches (T&H) shown in FIG. 9. It transmits to Vhold (by charging Chold) the output of the block EX.

Meanwhile, the variation dVhold/dt results in a current through Cslope that pulls up VS. VS being transmitted to VSH, VSH is pulled up (assuming no current flows through MS) and this creates more current in M1. The variation dVhold/dt is a positive variation in this embodiment which relates to direct sensing.

This I(M1) also flows through the sensing PMOS MP1, and MP1 copies this current to one branch B1 towards the NMOS MR, and to one branch B2 towards Chold.

The branch B1 is aimed at transmitting to MS the current that flows to M1, and I(MS) compensates as a regulation I(Cslope) so that eventually I(M1) tracks I(Cslope), which itself is Cslope*dVhold/dt. The branch B2 redirects the same current to Vhold, but S0 being ON, it has no consequences: this current is drained back to the EX block (Vhold is in low impedance).

Now, once the track and hold operation is ended S0 and S1 are turned OFF, and C1 keeps the memory of the gate of M1, so M1 keeps the memory of the current Cslope*dVhold/dt (via its gate voltage), and thus of dVhold/dt. So C1 keeps in memory what was the inductor current slope when it was tracked. This memorized slope, as a current, keeps on flowing in the branch B2, that goes now to Chold (S0 being OFF) and that maintains the slope dVhold/dt.

Chold being proportional to Cslope, a proper adjustment of the ratio between these capacitors, and also of the two mirrors (MP1, MP2 and MS, MR) in the tracking loop allows maintaining (and also optimizing in size) dVhold/dt identical before and after the T&H.

Eventually, when LX goes up, the extrapolation phase can be stopped and the final result is used for the IPEAK post-regulation.

A transistor level implementation can be simulated. The results are shown in the FIG. 12, which illustrates the track and hold signal 1200 as shown in FIG. 7, the voltage 1202 that corresponds to the inductor current and also with the extrapolation capability (corresponding to strip 712 in FIG. 7), the actual inductor current 1204 and the inductor switching node voltage (LX) 1206. This is one extremity of the inductor and when it goes up, given the inductor bias is {V(LX)−V(BAT)}, then the inductor has reached its peak current because it will start to decrease.

Figure 12:
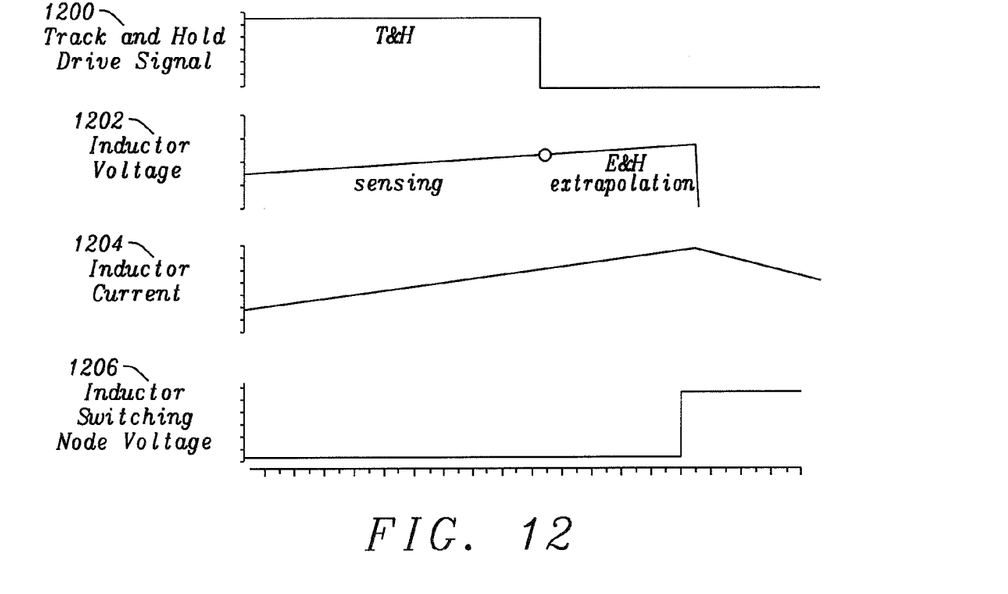
FIG. 12 illustrates further aspects of a peak current detection method according to an embodiment of the disclosure.

The drive signal 1200 of the power transistor MP is held high during a track and hold (T&H) phase. When it goes low, the sensed inductor current 1002 (Vhold) of FIG. 10 still increases its voltage in an identical way as what it was during the T&H phase, thanks to this extrapolation system. Thus, it keeps on tracking the actual inductor current 1204.

The extrapolation phase is ended only when LX 1206 goes up, and just before this operation the current value is transmitted to the post-regulation loop using the PK switches of FIG. 11.

Note that a deliberate error on the dVhold/dt was introduced. We see a slight variation of the slope between the track and hold phase and the extrapolation phase, for the purpose of a clear figure.

The present disclosure therefore allows for tightening the accuracy for inductor peak current limitation, or for peak current limitation in other circuit components.

Various modifications and improvements can be made to the above without departing from the scope of the disclosure.

What is claimed is:

1. A method of measuring a current through a circuit component which is coupled between an input supply and an output node, and whereby a power switch is provided which selectively couples the component with the input and/or the output; the method comprising:

extracting an electrical parameter associated with the component at a time of changing the state of the power switch;
storing information about the rate of change of the extracted electrical parameter;
extrapolating a measured electrical parameter value based on the stored rate of change information; and
determining a boundary current value based on an extrapolated electrical parameter value.

2. The method of claim 1, wherein the electrical parameter associated with the component is a current through the circuit component.

3. The method of claim 1, wherein the electrical parameter associated with the component is a voltage at or across the circuit component.

4. The method of claim 1, wherein extracting an electrical parameter associated with the component at a time of changing the state of the power switch comprises extracting the electrical parameter with a scaled sense device.

5. The method of claim 4, wherein extracting the electrical parameter with a scaled sense device comprises creating a scaled replica of a current through the component and comparing it with a reference, either as a voltage or a current comparison.

6. The method of claim 4, wherein extracting the electrical parameter with a scaled sense device comprises comparing a voltage across the power switch that is caused by the current flowing through the component with the voltage across a sense device that is coupled with a reference current source which generates a scaled version of the desired boundary current value.

7. The method of claim 1, wherein the circuit component is an energy storing element.

8. The method of claim 7, wherein the energy storing element is an inductor.

9. The method of claim 8, wherein determining a boundary current value based on an extrapolated electrical parameter value comprises stopping the extrapolation when the inductor voltage polarity changes its sign.

10. The method of claim 8, wherein the inductor forms part of a switched mode power supply circuit and the power switch is operable to alternate the phases of the switched mode power supply circuit.

11. The method of claim 1, wherein the boundary current value is a peak current value.

12. The method of claim 1, wherein the boundary current value is a minimum current value.

13. A DC-DC converter comprising an input supply; an output node; a circuit component coupled between said input supply and output node; a power switch which selectively couples the component with the input and/or the output; and a peak current detector arranged to: extract an electrical parameter associated with the component at a time of changing the state of the power switch; store information about the rate of change of the extracted electrical parameter; extrapolate a measured electrical parameter value based on the stored rate of change information; and determine a boundary current value based on an extrapolated electrical parameter value.

14. The DC-DC converter of claim 13, wherein the circuit component is an energy storing element.

15. The DC-DC converter of claim 14, wherein the energy storing element is an inductor.

16. The DC-DC converter of claim 15, wherein inductor forms part of a switched mode power supply circuit and the power switch is operable to alternate the phases of the switched mode power supply circuit.

17. The DC-DC converter of claim 13, wherein the boundary current value is a peak current value.

18. The DC-DC converter of claim 13, wherein the boundary current value is a minimum current value.

19. A current detector circuit comprising:
   an extraction module arranged to extract an electrical parameter associated with a circuit component;
   a slope extractor module arranged to store information about the rate of change of the extracted electrical parameter and to extrapolate a measured electrical parameter value based on the stored rate of change information;
   a converter module arranged to determine a boundary current value based on an extrapolated electrical parameter value.

20. The current detector circuit of claim 19, wherein the boundary current value is a peak current value.

21. The current detector circuit of claim 19, wherein the boundary current value is a minimum current value.

* * * * *